(12) United States Patent
Lika (10) Patent No.: US 12,516,723 B2
(45) Date of Patent: Jan. 6, 2026

(54) TRANSMISSION OIL FILTER MODULE (71) Applicant: Mahle International GmbH, Stuttgart (DE)

(72) Inventor: Torsten Lika, Stuttgart (DE)

(73) Assignee: Mahle International GmbH (DE)

( * ) Notice: Subject to any disclaimer, the term of this patent is extended or adjusted under 35 U.S.C. 154(b) by 344 days.

(21) Appl. No.: 17/912,490

(22) PCT Filed: Feb. 10, 2021

(86) PCT No.: PCT/EP2021/053121
§ 371 (c)(1),
(2) Date: Jul. 19, 2024

(87) PCT Pub. No.: WO2021/185513
PCT Pub. Date: Sep. 23, 2021

(65) Prior Publication Data
US 2025/0320915 A1    Oct. 16, 2025

(30) Foreign Application Priority Data

Mar. 18, 2020 (DE) .................. 10 2020 203 458.3

(51) Int. Cl.
*F16H 57/04* (2010.01)
(52) U.S. Cl.
CPC ..... *F16H 57/0404* (2013.01); *F16H 57/0408* (2013.01); *F16H 57/0413* (2013.01); *F16H 57/0415* (2013.01); *F16H 57/0435* (2013.01); *F16H 57/0436* (2013.01); *F16H 57/045* (2013.01)

(58) Field of Classification Search
CPC ............ F16H 57/0404; F16H 57/0408; F16H 57/0436; F16H 57/0435; F16H 57/0413; F16H 57/045
USPC ....................................................... 184/6.12
See application file for complete search history.

(56) References Cited

U.S. PATENT DOCUMENTS

| 4,844,202 A * | 7/1989 | Maresko ................... F16N 7/40 |
| | | 184/6.12 |
| 4,854,276 A * | 8/1989 | Elsbett ...................... F01P 9/00 |
| | | 123/196 AB |
| 5,522,476 A * | 6/1996 | Holman .............. F16H 57/0456 |
| | | 184/6.12 |

(Continued)

FOREIGN PATENT DOCUMENTS

| DE | 19942543 A1 | 3/2001 |
| DE | 19950967 A1 | 5/2001 |

(Continued)

OTHER PUBLICATIONS

English abstract for DE-102010026429.

(Continued)

*Primary Examiner* — Henry Y Liu
(74) *Attorney, Agent, or Firm* — Fishman Stewart PLLC (57) ABSTRACT

A transmission oil filter module for an electric/hybrid vehicle, said module may include a housing part, a pump for pumping transmission oil, an oil filter, a heat exchanger for cooling the transmission oil, an oil filter bypass valve, and/or an oil sump. The oil filter may be located on a pressure side of the pump. The oil filter bypass valve may, when open, release a bypass that bypasses the oil filter. The oil sump may have an oil drain plug.

20 Claims, 5 Drawing Sheets

(56) References Cited

U.S. PATENT DOCUMENTS

| | | | | |
|---|---|---|---|---|
| 5,544,540 | A * | 8/1996 | Holman | F16H 57/0493 |
| | | | | 184/6.12 |
| 6,217,758 | B1 * | 4/2001 | Lee | F01M 11/0004 |
| | | | | 210/186 |
| 6,708,665 | B1 * | 3/2004 | Lehmann | F16H 57/0415 |
| | | | | 123/196 R |
| 7,055,405 | B1 * | 6/2006 | Nitsche | F16H 61/0009 |
| | | | | 74/606 R |
| 7,717,070 | B2 * | 5/2010 | Kanig | F01P 7/165 |
| | | | | 123/196 AB |
| 10,001,038 | B2 * | 6/2018 | Will | F01M 5/001 |
| 10,859,089 | B2 * | 12/2020 | Snyder | F16N 39/06 |
| 11,085,448 | B2 * | 8/2021 | De Bontridder | F04C 2/102 |
| 11,181,110 | B2 * | 11/2021 | Hebrard | F04C 18/16 |
| 12,098,727 | B2 * | 9/2024 | Snyder | F16N 39/02 |
| 2002/0032088 | A1 * | 3/2002 | Korenjak | F02B 61/045 |
| | | | | 474/14 |
| 2004/0031636 | A1 * | 2/2004 | Pichler | B60K 5/04 |
| | | | | 180/190 |
| 2007/0227474 | A1 * | 10/2007 | Kanig | F01P 3/20 |
| | | | | 123/41.33 |
| 2009/0194061 | A1 * | 8/2009 | Ardes | F01P 7/16 |
| | | | | 123/195 C |
| 2010/0187044 | A1 * | 7/2010 | Nabeshima | B60B 11/06 |
| | | | | 184/26 |
| 2011/0132012 | A1 * | 6/2011 | Heindl | F15B 21/0423 |
| | | | | 62/196.1 |
| 2011/0148354 | A1 * | 6/2011 | Wenger | F16F 1/376 |
| | | | | 320/109 |
| 2013/0119793 | A1 * | 5/2013 | Hofkirchner | H02K 5/203 |
| | | | | 310/54 |
| 2016/0010520 | A1 * | 1/2016 | Will | F01M 5/001 |
| | | | | 123/196 AB |
| 2018/0087520 | A1 * | 3/2018 | Snyder | F16N 39/02 |
| 2018/0306189 | A1 * | 10/2018 | De Bontridder | F04C 2/102 |
| 2021/0048034 | A1 * | 2/2021 | Snyder | F04D 29/063 |
| 2021/0199188 | A1 * | 7/2021 | Stausberg | F16N 39/06 |

FOREIGN PATENT DOCUMENTS

| | | |
|---|---|---|
| DE | 102006008498 A1 | 8/2007 |
| DE | 102008032494 A1 | 2/2009 |
| DE | 102008030969 A1 | 12/2009 |
| DE | 102010026429 A1 | 1/2012 |
| DE | 102012010718 A1 | 12/2013 |
| DE | 102015209573 A1 | 12/2016 |
| DE | 102016202625 B3 | 5/2017 |
| JP | 02026362 | 1/1990 |
| JP | 0673304 | 10/1994 |
| WO | 2017097605 A1 | 6/2017 |
| WO | 2020101550 A1 | 5/2020 |

OTHER PUBLICATIONS

English abstract for DE-102006008498.
English abstract for DE-102015209573.
English abstract for DE-102008032494.
English abstract for JP-102008032494.
English abstract for DE-102012010718.
German Search Report for DE-102020203458.3, dated Nov. 4, 2020.

* cited by examiner

TRANSMISSION OIL FILTER MODULE

CROSS-REFERENCE TO RELATED APPLICATIONS

This application claims priority to International Application No. PCT/EP2021/053121, filed on Feb. 10, 2021, and German Patent Application No. DE 10 2020 203 458.3, filed on Mar. 18, 2020, the contents of both are hereby incorporated by reference in its entirety.

TECHNICAL FIELD

The present invention relates to a transmission oil filter module. Furthermore, the invention relates to a motor vehicle, in particular an electric or hybrid vehicle, or a transmission comprising such a transmission oil filter module.

BACKGROUND

For powerful electric motors it can be necessary, under certain circumstances, to integrate an additional transmission in order to be able to transmit a torque. Usually here a lubrication by means of oil is provided for the transmission. Such a lubrication comprises here a lubrication circuit with an oil filter, an oil reservoir, a heat exchanger for cooling the transmission oil, and a pump.

A disadvantage in the transmission oil filter modules known from the prior art are their high noise emissions and an improvable efficiency.

The present invention is therefore concerned with the problem of indicating a transmission oil filter module, which in particular has lower noise emissions and has an increased efficiency.

SUMMARY

The present invention is based on the general idea of arranging, in a transmission oil filter module, an oil filter on the pressure side of a pump for conveying transmission oil, whereby not only a distinctly increased efficiency is possible compared to oil filters arranged conventionally on the suction side of the pump, but also a distinctly lower background noise. The transmission oil filter module according to the invention is used here for example for an electric or hybrid vehicle and has a housing part and the previously described pump for conveying transmission oil. According to the invention, the oil filter is arranged on the pressure side of this pump. A heat exchanger for cooling the transmission oil and an oil filter bypass valve which, when open, releases a bypass that bypasses the oil filter, are also provided. The housing part has, furthermore, an oil sump having an oil drain plug, wherein individual channels between the pump and the oil filter and between the oil filter and the heat exchanger are integrated into the housing part. With the oil filter module according to the invention, in which the oil filter is arranged on the pressure side of the pump, i.e., downstream thereof, however not only can the previously mentioned advantages with regard to efficiency and noise emissions be achieved, but in addition also a comparatively simple, economical and compact construction can be achieved, in particular in so far as the housing part is configured for example as a plastic injection moulded part. In addition, it is of great advantage here that oil lines, for example from the pump to the oil filter, can be integrated into the housing part, whereby an external line routing, accompanied by the installation effort entailed therewith and an increased risk of leakage, can be avoided. All in all, a distinct improvement can thus be achieved with the transmission oil filter module according to the invention.

In an advantageous further development of the solution according to the invention, a first oil temperature sensor, arranged upstream of the heat exchanger, is provided for detecting an oil temperature, wherein additionally or alternatively a second oil temperature sensor can be provided downstream of the heat exchanger. Via the oil temperature sensors, the oil temperature can be detected extremely accurately and in particular also the performance of the heat exchanger can be regulated, in so far as for example the second oil temperature sensor detects an oil temperature which is too high.

In an advantageous further development of the solution according to the invention, a first insertion opening to receive the first oil temperature sensor and/or a second insertion opening to receive the second oil temperature sensor is/are provided in the housing part. The first and/or second oil temperature sensor can be fixed here via a clip connection in the respectively associated insertion opening. Hereby, a comparatively simple installation and also a comparatively simple dismantling of the oil temperature sensor and thus a comparatively simple maintenance of the transmission oil filter module are possible. If, for example, no oil temperature sensor is to be provided, then the respective insertion opening can be simply and reliably closed with a corresponding blind plug.

Expediently, detent contours are provided, which are formed in one piece with the housing part, while associated detent lugs are provided on the respective oil temperature sensor or on a blind plug to be inserted if necessary, which in the installed state can be clipped with the detent contours. Through the formation of the detent contours in one piece with the housing part, a further functional integration can be achieved, so that the connection means necessary for fixing the first and/or second oil temperature sensor or respectively the blind plug in the insertion opening can be already at least partially produced together with the housing part.

In a further advantageous embodiment of the solution according to the invention, an oil pressure sensor is arranged between the pump and the oil filter, i.e., upstream of the oil filter. Via such an oil pressure sensor, which is also able to be fixed for example via a corresponding clip connection, in an analogous manner to the oil temperature sensors, in an insertion opening provided for this in the housing part, an oil pressure can be detected upstream of the oil filter and hence a conclusion can be drawn regarding a permeability of the oil filter or respectively a wear thereof.

In a further advantageous embodiment of the solution according to the invention, a pre-filter is arranged on the suction side of the pump. Via such a pre-filter, coarse impurities, in particular those which originate from the transmission, can be filtered out, whereby it can be prevented that these arrive into the pump and can lead to damage there.

In a further advantageous embodiment of the solution according to the invention, a heat exchanger bypass valve is provided which, when open, release a bypass that bypasses the heat exchanger. If the transmission oil has for example not yet reached its operating temperature, the heat exchanger bypass valve opens and directs the oil flow past the heat exchanger. Such a heat exchanger bypass valve can be formed for example by means of a wax element and hence in a self-regulating and economical manner.

The present invention is further based on the general idea of equipping an electric/hybrid vehicle or a transmission with such a transmission oil filter module and thereby transferring to the electric/hybrid vehicle or respectively the transmission the advantages of the transmission oil filter module described in the previous paragraphs. In particular, with a transmission oil filter module according to the invention, installed in such a motor vehicle, a distinctly higher efficiency and a distinctly reduced background noise can be achieved.

Further important features and advantages of the invention will emerge from the subclaims, from the drawings and from the associated figure description with the aid of the drawings.

It shall be understood that the features named above and to be explained further below are able to be used not only in the respectively indicated combination, but also in other combinations or in isolation, without departing from the scope of the present invention.

BRIEF DESCRIPTION OF THE DRAWINGS

Preferred example embodiments of the invention are illustrated in the drawings and are explained more closely in the following description, wherein the same reference numbers refer to identical or similar or functionally identical components.

There are shown here, respectively schematically.

DETAILED DESCRIPTION

Figure 1:
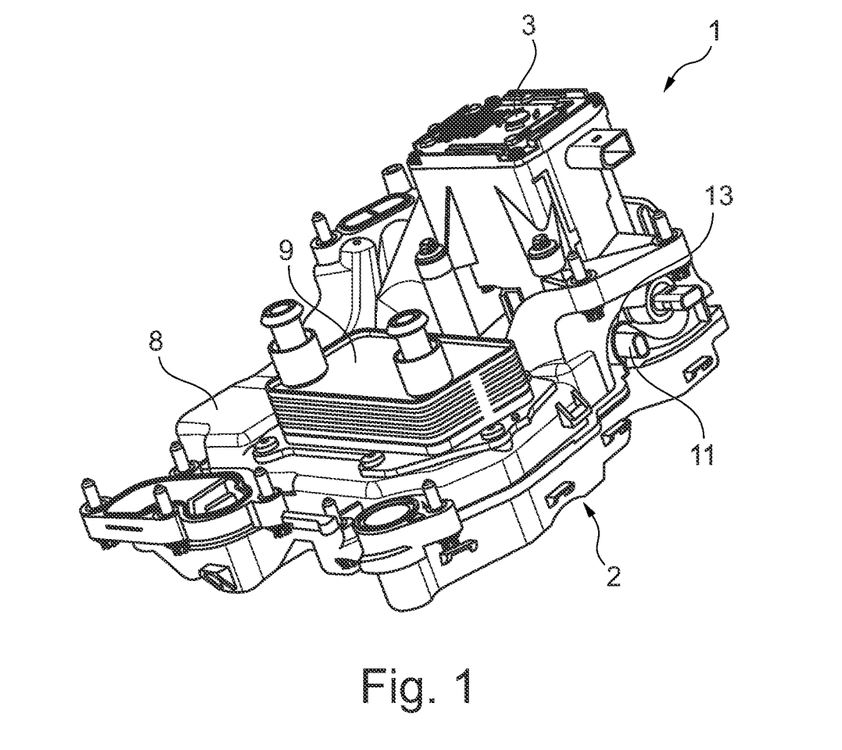
FIG. 1 an oblique view onto a transmission oil filter module according to the invention, FIG. 2 an illustration as in FIG. 1, but of a different oblique view, FIG. 3 a view from above onto the transmission oil filter module according to the invention, FIG. 4 an illustration as in FIG. 3, but from below, FIG. 5 a sectional view through the transmission oil filter module according to the invention in the region of an optional pre-filter, FIG. 6 a sectional view through the transmission oil filter module according to the invention through a channel running between a pump and a [ ] in the oil filter with a pressure sensor inserted therein, FIG. 7 a sectional view through the transmission oil filter module according to the invention in the region of an integrated oil filter, FIG. 8 a sectional view in the region of an oil filter and of a bypass valve, FIG. 9 a sectional illustration in the region of a first oil temperature sensor upstream of a heat exchanger, FIG. 10 a sectional view through the transmission oil filter module according to the invention in the region of a second oil temperature sensor downstream of the heat exchanger.
Figure 2:
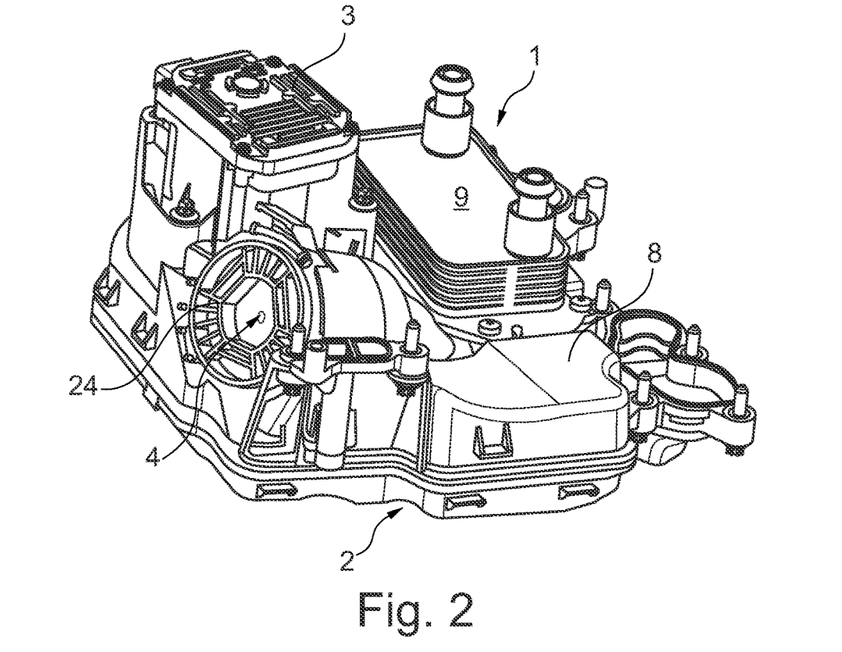
Figure 3:
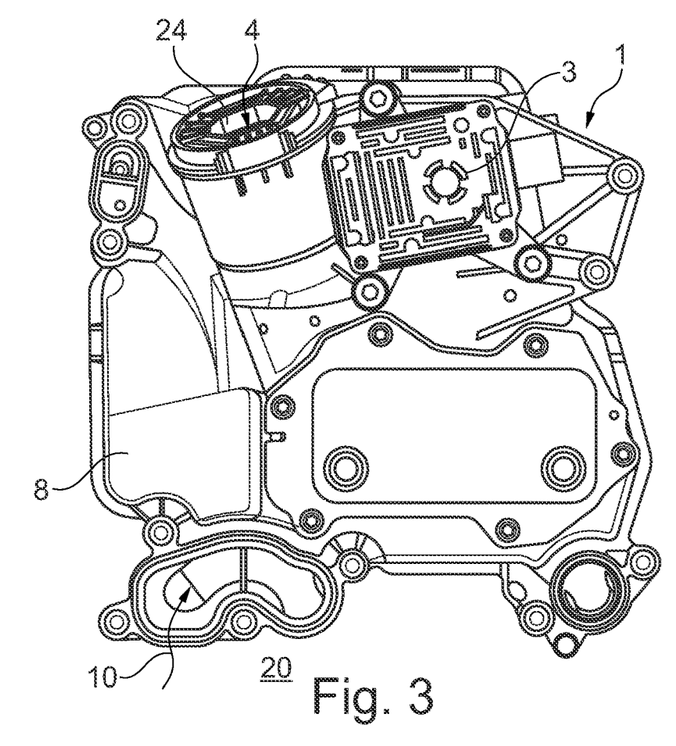
Figure 4:
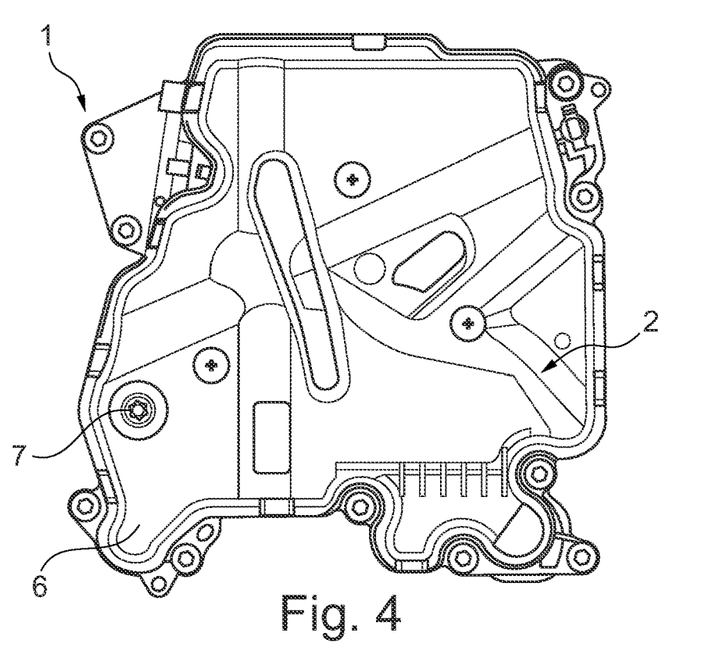
Figure 5:
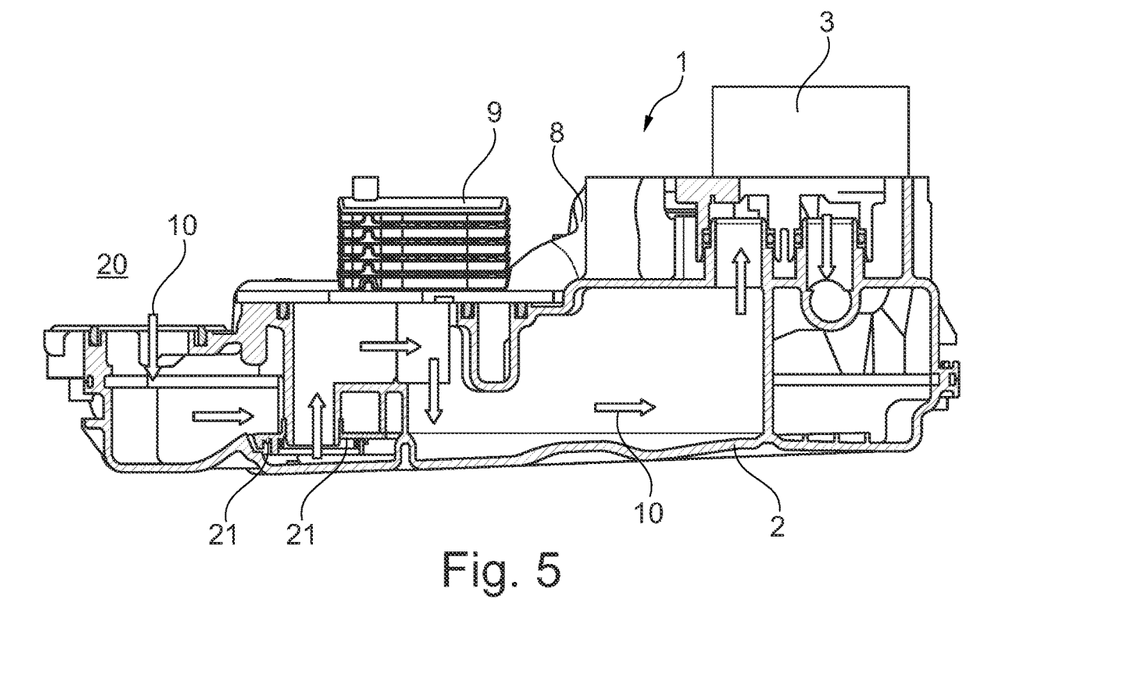
Figure 6:
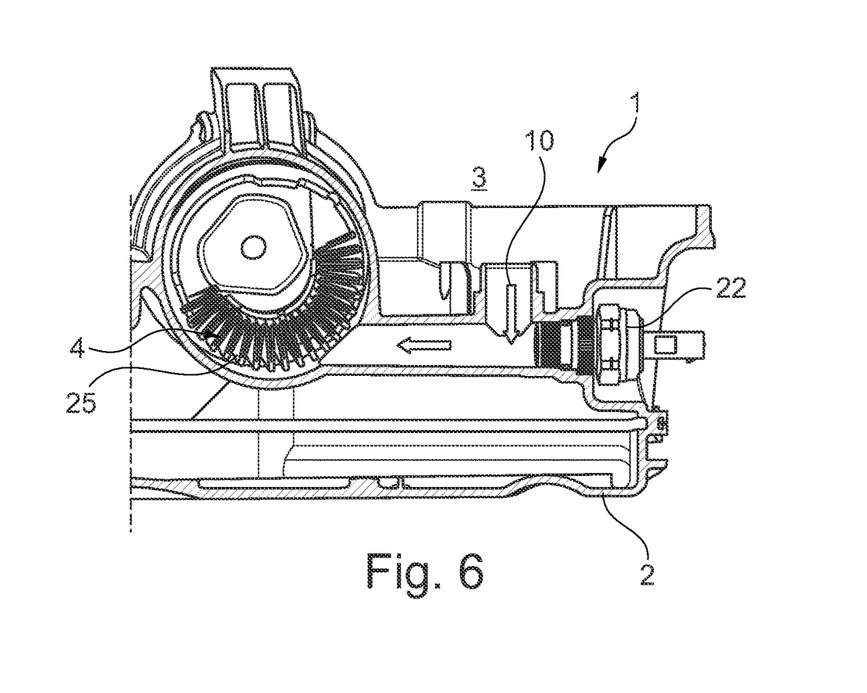

According to FIGS. 1 to 8, a transmission oil filter module 1 according to the invention has at least one housing part 2 which forms a part of a transmission oil filter module housing, a pump 3 (cf. FIG. 5), an oil filter 4 arranged on the pressure side of the pump 3 (cf. FIGS. 2, 6 and also 7 and 8), an oil filter bypass valve 5 which, when open, releases a bypass that bypasses the oil filter 4 (cf. FIG. 7), and an oil sump 6 having an oil drain plug 7 (cf. in particular FIG. 4). In addition, the transmission oil filter module 1 has a heat exchanger 9 for cooling the transmission oil 10. Through the pressure-side arrangement of the oil filter 4 with respect to the pump 3, a distinctly improved efficiency of the transmission oil filter module 1 according to the invention, as well as a distinctly reduced noise emission, can be achieved. The housing part 2, which in the present case is configured as a lower housing part, and a further housing part 8 (cf. FIGS. 1 and 2) can be connected tightly to one another, in particular bonded, here along a separation plane or respectively separation contour.

Through the arrangement both of the pump 3 and also of the oil filter 4, of the oil filter bypass valve 5, of the oil sump 6, of the oil drain plug 7 and of all channels arranged therebetween in the transmission oil filter module 1 according to the invention, furthermore a comparatively compact construction can be achieved. The housing part 2 or respectively the further housing part 8 can preferably be formed here from plastic, in particular as single-piece plastic injection moulded parts.

Upstream of the heat exchanger 9, preferably a first oil temperature sensor 11 is arranged here (cf. FIGS. 1 and 9), while additionally or alternatively a second oil temperature sensor 12 (cf. FIGS. 2 and 10) can be provided downstream of the heat exchanger 9. A cooling requirement in the heat exchanger 9 can be precisely predetermined via a temperature detection upstream and downstream of the heat exchanger 9.

A respectively associated insertion opening 13, 14 is provided in the housing part 2 to receive the first or respectively second oil temperature sensor 11, 12, wherein the first oil temperature sensor 11 is able to be inserted into the first insertion opening 13 and the second oil temperature sensor 12 is able to be inserted into the second insertion opening 14 and is able to be locked there via a clip connection. By means of such a clip connection it is possible to fix the two oil temperature sensors 11, 12 simply, but nevertheless reliably, in the associated insertion openings 13, 14, and in addition a comparatively simple possibility for dismantling is also provided, which in particular distinctly simplifies a maintenance in which an exchange of the respective oil temperature sensor 11, 12 is necessary.

Figure 9:
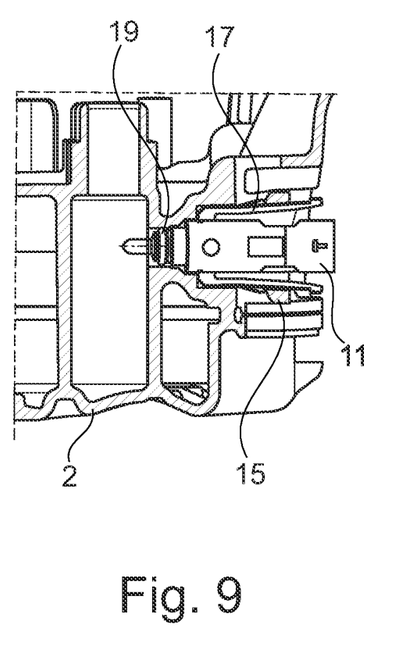
Figure 10:
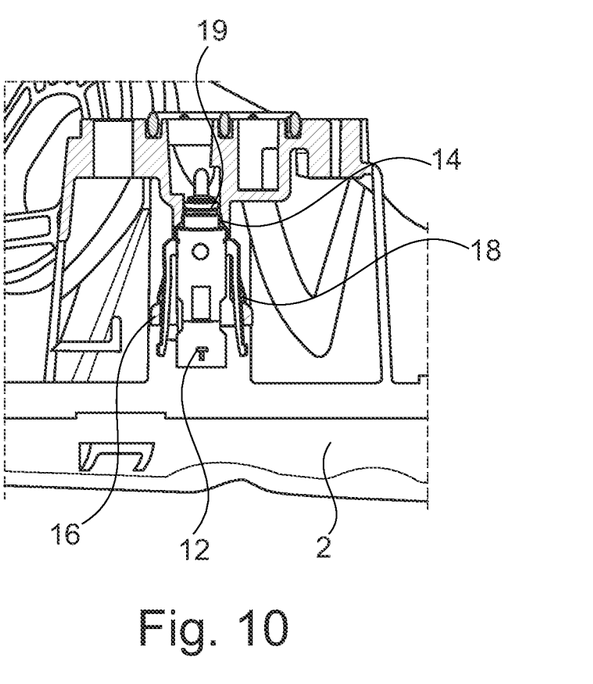

For this, the respective clip connections have detent contours 15, 16, namely detent contours 15 in the first insertion opening 13 for the first oil temperature sensor 11 and detent contours 16 in the second insertion opening 14 for the second oil temperature sensor 12 (cf. FIGS. 9 and 10). In order to be able to cooperate with the respective detent contours 15, 16 in a fixing manner, the first and/or second oil temperature sensor 11, 12 has detent lugs 17, 18 (cf. FIGS. 9 and 10), which in the installed state are clipped with the respective detent contours 15, 16 or respectively engage behind these.

Observing FIGS. 9 and 10 more closely, it can be seen that the respectively illustrated oil temperature sensor 11, 12 is inserted in a tight manner into respectively associated insertion openings 13, 14 via a seal 19, for example via an O-ring seal. The detent lugs 17, 18 can be actuated here from the exterior, whereby a releasing of the respective oil temperature sensor 11, 12 from the associated insertion opening 13, 14 is possible in a simple manner.

In addition, an oil flow within the transmission oil filter module 1 is to be explained more closely in the following: According to FIG. 5, transmission oil 10 arrives from a transmission 20, not depicted more closely, and enters into the oil sump 6 or respectively into the housing part 2. Subsequently, it flows through a pre-filter 21, arranged on the suction side of the pump 3, whereby the transmission oil 10 is cleaned before entry into the pump 3. Subsequently, the transmission oil 10 is suctioned by the pump 3 and passed on to the oil filter 4 (cf. FIG. 6). In a channel directing the transmission oil between the pressure side of the pump 3 and the oil filter 4, an oil pressure sensor 22 is arranged, which detects the pressure in the transmission oil 10 and concludes via this a status of wear of the oil filter 4. After flowing through the oil filter 4 (cf. FIG. 7), the transmission oil 10 flows into the heat exchanger 9 and is cooled there, wherein the heat exchanger 9 is connected to a cooling circuit by means of corresponding coolant connections, which are not designated more closely. The heat exchanger 9 is screwed here to the housing part 2, wherein seals, lying between, are provided. Such an arrangement enables a comparatively simple replacing of the heat exchanger 9. In addition to the oil pressure sensor 22, an oil filter bypass valve (cf. FIG. 7) is arranged upstream of the oil filter 4, which bypass valve opens after a predefined oil pressure and thereby bypasses the oil filter 4, by connecting a raw side with a clean side of the oil filter 4.

Figure 8:
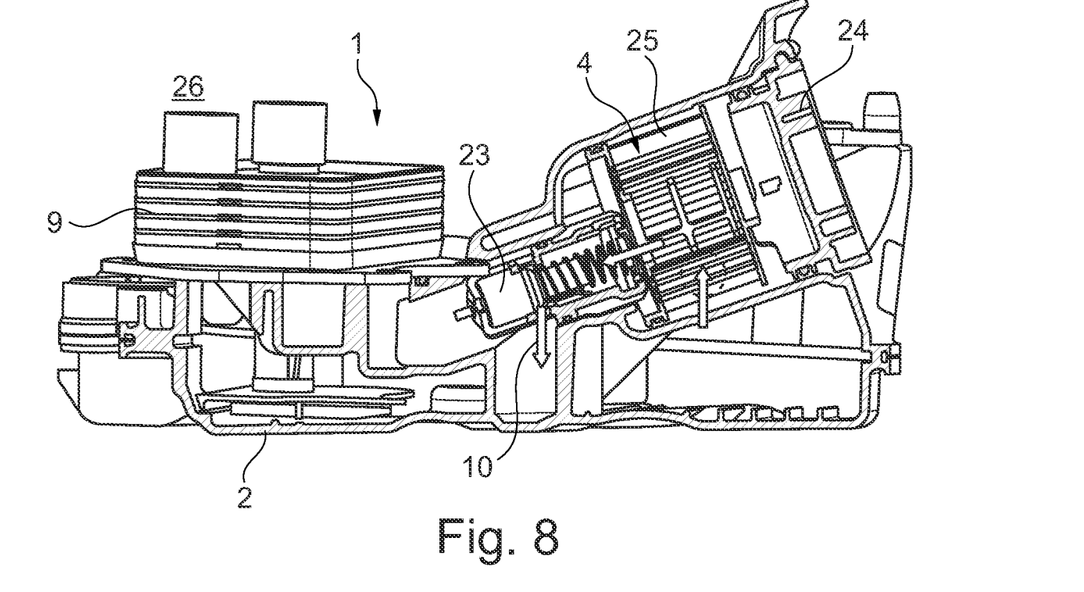

Observing FIG. 8, a heat exchanger bypass valve 23 is provided there upstream of the heat exchanger 9, which bypass valve opens and closes in a temperature-dependent manner, for example by means of a corresponding wax element, and which then exclusively delivers transmission oil 10 to the heat exchanger 9 in so far as this exceeds a predetermined temperature threshold.

Figure 7:
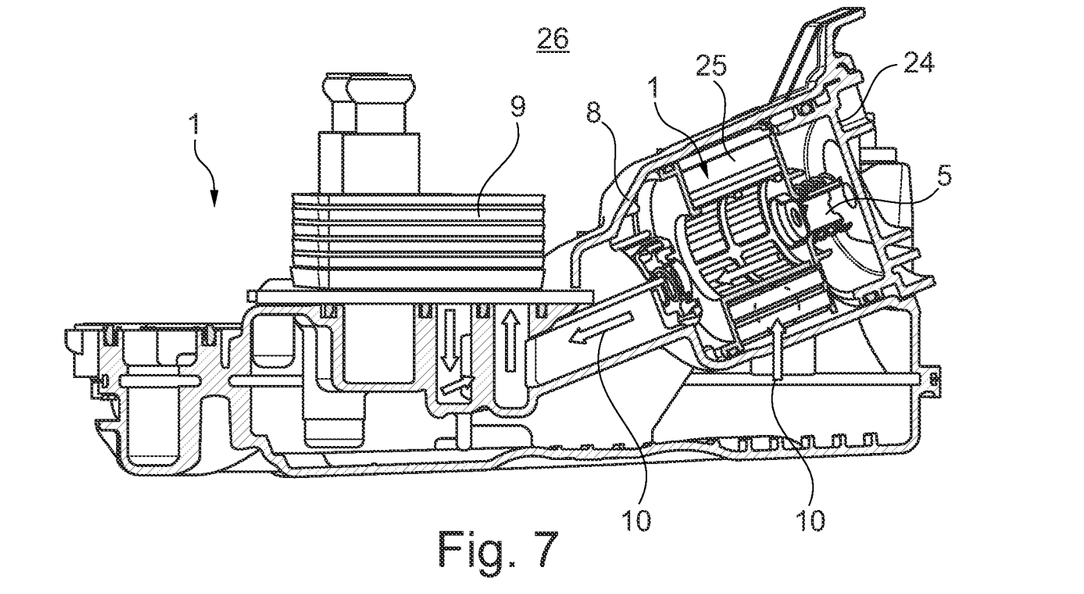

Observing FIGS. 7 and 8 further, it can be seen that the housing part 2 has in the region of the oil filter 4 a removable cover 24, which in removed state enables an exchanging of the oil filter 4 or respectively its filter element, and which is able to be mounted and dismantled in a simple manner by means of a screw closure or respectively a bayonet closure. Through the inclination of the cover by ca. 35° to a vertical, and hence also through an inclination of a filter element of the oil filter 4 to a horizontal by ca. 35°, an exchanging of the filter element 25 is possible under certain circumstances also without complete draining of the transmission oil 10 via the oil drain plug 7.

Through the integration of the individual channels between the individual components, for example the pump 3 and the oil filter 4 or respectively the oil filter 4 and the heat exchanger 9 into the housing part 2, a laborious external line routing can be dispensed with entirely, whereby not only the installation effort but as a whole also the production costs can be reduced. The pressure-side arrangement of the oil filter 4 with respect to the pump 3 is of particular advantage in the transmission oil filter module 1 according to the invention, through which the efficiency can be increased and the noise emissions generated by the transmission oil filter module 1 can be reduced.

Such a transmission oil filter module 1 can be used for example in an electric/hybrid vehicle 26 for the temperature management of a transmission 20.

The invention claimed is:

1. A transmission oil filter module for an electric/hybrid vehicle, said module comprising:
a housing part;
a pump for pumping transmission oil;
an oil filter located on a pressure side of the pump;
a heat exchanger for cooling the transmission oil;
an oil filter bypass valve which, when open, releases a bypass that bypasses the oil filter; and
an oil sump having an oil drain plug;
wherein individual channels between the pump and the oil filter and also between the oil filter and the heat exchanger are integrated into the housing part.

2. The transmission oil filter module according to claim 1, wherein:
a first oil temperature sensor, arranged upstream of the heat exchanger is provided for detecting an oil temperature; and/or
a second oil temperature sensor, arranged downstream of the heat exchanger, is provided for detecting an oil temperature.

3. The transmission oil filter module according to claim 2, wherein:
in the housing part, a first insertion opening is provided for receiving the first oil temperature sensor; and/or
in the housing part, a second insertion opening is provided for receiving the second oil temperature sensor.

4. The transmission oil filter module according to claim 3, wherein:
the first oil temperature sensor is fixed tightly in the first insertion opening via a clip connection; and/or
that the second oil temperature sensor is fixed tightly in the second insertion opening via a clip connection.

5. The transmission oil filter module according to claim 4, wherein:
detent contours are provided, which are formed in one piece with the housing part; and/or
the first and/or the second oil temperature sensor has detent lugs, which in an installed state are clipped with the associated detent contours.

6. The transmission oil filter module according to claim 1, wherein
an oil pressure sensor is provided, arranged between the pump and the oil filter.

7. The transmission oil filter module according to claim 1, wherein
a pre-filter is arranged on a suction side of the pump.

8. The transmission oil filter module according to claim 1, wherein
a heat exchanger bypass valve is provided which, when open, releases a bypass that bypasses the heat exchanger.

9. An electric or hybrid vehicle, comprising:
a transmission oil filter module according to claim 1.

10. A transmission oil filter module, comprising:
a housing part;
a pump for pumping transmission oil;
an oil filter located on a pressure side of the pump;
a heat exchanger for cooling the transmission oil;
an oil filter bypass valve which, when open, releases a bypass that bypasses the oil filter;
an oil sump having an oil drain plug;
a first oil temperature sensor arranged upstream of the heat exchanger; and
a second oil temperature sensor arranged downstream of the heat exchange;
wherein individual channels between the pump and the oil filter and also between the oil filter and the heat exchanger are integrated into the housing part.

11. The transmission oil filter module according to claim 10, wherein in the housing part, a first insertion opening is provided for receiving the first oil temperature sensor.

12. The transmission oil filter module according to claim 10, wherein in the housing part, a second insertion opening is provided for receiving the second oil temperature sensor.

13. The transmission oil filter module according to claim 11, wherein the first oil temperature sensor is fixed tightly in the first insertion opening via a clip connection.

14. The transmission oil filter module according to claim 12, wherein the second oil temperature sensor is fixed tightly in the second insertion opening via a clip connection.

15. The transmission oil filter module according to claim 10, wherein detent contours are provided, which are formed in one piece with the housing part.

16. The transmission oil filter module according to claim 15, wherein the first and/or the second oil temperature sensor has detent lugs, which in an installed state are clipped with the associated detent contours.

17. The transmission oil filter module according to claim 10, wherein an oil pressure sensor is provided, arranged between the pump and the oil filter.

18. The transmission oil filter module according to claim 10, wherein a pre-filter is arranged on a suction side of the pump.

19. The transmission oil filter module according to claim 10, wherein a heat exchanger bypass valve is provided which, when open, releases a bypass that bypasses the heat exchanger.

20. An electric or hybrid vehicle, comprising:
a transmission oil filter module according to claim 10.

* * * * *